No. 717,987. PATENTED JAN. 6, 1903.
F. W. GURNEY.
BALL BEARING.
APPLICATION FILED JAN. 6, 1902. RENEWED DEC. 15, 1902.
NO MODEL.
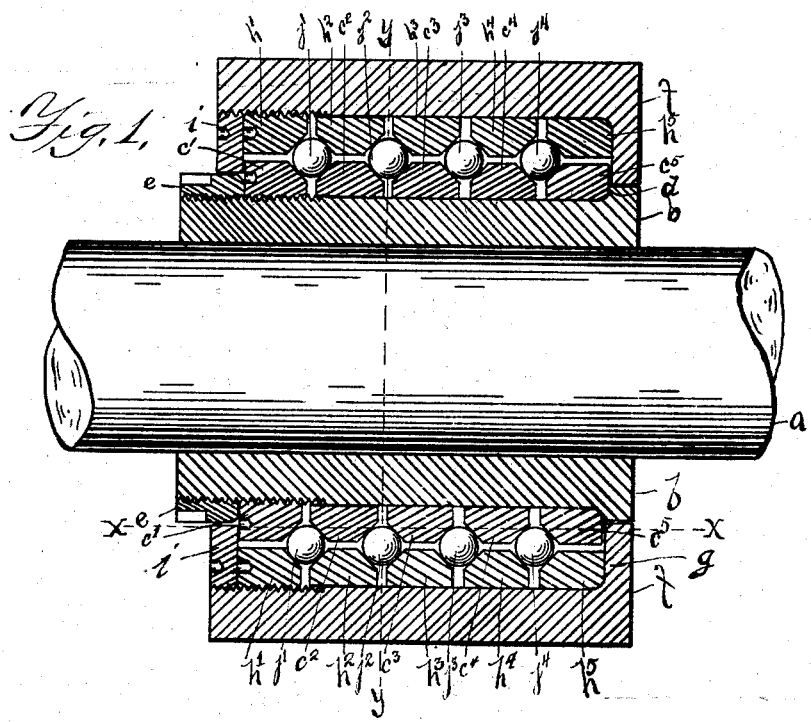
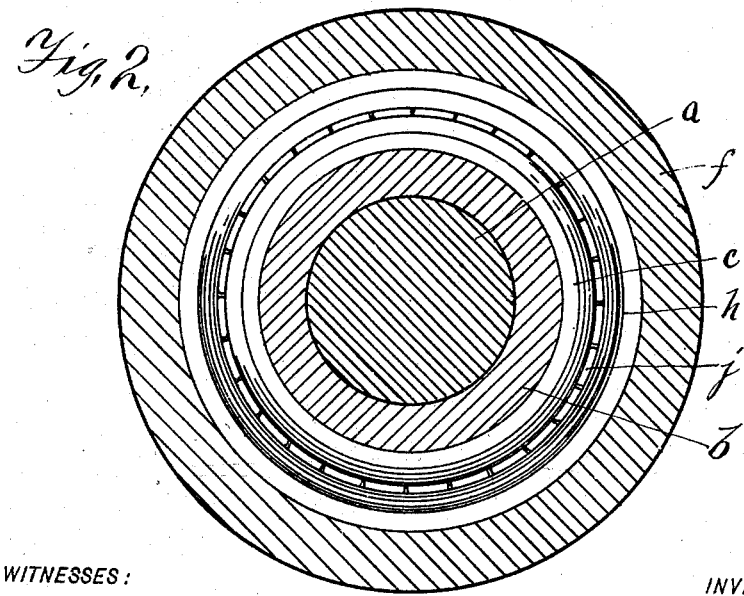
WITNESSES:
Ira Williams
L. A. Dunham.
INVENTOR
Frederick W. Gurney
BY
S. Arthur Baldwin
ATTORNEY

UNITED STATES PATENT OFFICE.

FREDERICK W. GURNEY, OF CHATTANOOGA, TENNESSEE.

BALL-BEARING.

SPECIFICATION forming part of Letters Patent No. 717,987, dated January 6, 1903.

Application filed January 6, 1902. Renewed December 15, 1902. Serial No. 135,329. (No model.)

*To all whom it may concern:*

Be it known that I, FREDERICK W. GURNEY, a citizen of the United States, and a resident of Chattanooga, county of Hamilton, and State of Tennessee, have invented a new and useful Ball-Bearing, of which the following is a specification.

The object of my invention is to obtain a ball-bearing which can sustain great loads without friction and without danger of breaking and which can be made at moderate expense by obviating the necessity of costly exactness. It is specially applicable to such uses as on car and locomotive journals, heavy jack-shafts, engine-journals, and any bearings which are subjected to great pressure. I attain this object by mechanism as illustrated in the accompanying drawings, in which—

Figure 1 is a diametral lengthwise sectional view of my ball-bearing and case therefor. Fig. 2 is a sectional view of my ball-bearing at line $y\ y$ in Fig. 1.

Similar letters refer to similar parts in the several views.

In the accompanying drawings, $a$ represents the shaft or journal. $b$ is a sleeve thereon. In some cases, as in car-journals, it may be preferable to dispense with the sleeve $b$, the journal itself being adapted to perform the same function. In such cases the sleeve and journal may be regarded as integral. On the journal-sleeve $b$ are mounted the rings $c$ with a snug sliding fit. Adjacent outer edges of rings $c$ are beveled or chamfered off, so that a ball-race is formed between each adjacent pair of rings. One end of the journal-sleeve $b$ is formed with a shoulder $d$, and the other end is threaded, so that a ring $c^5$ abuts against the shoulder $d$ on one end, and the ring $c'$ on the other end is threaded to screw onto the end of the journal-sleeve $b$. Outside of the threaded ring $c'$ is the lock-nut $e$.

$f$ is the box or casing. Like the journal-sleeve $b$, it is provided at one end with a flange $g$ and threaded in the other end. Fitted snugly within the box $f$ are the rings $h$. The last ring at one end $h^5$ abuts against the flange $g$, and at the other end the ring $h'$ is threaded, so that it screws into the box $f$. Ring $h'$ is also provided with a locking-ring $i$. The inner adjacent edges of the rings $h$ are beveled or chamfered off in like manner with edges of rings $c$, so that races are formed between adjacent rings $h$. Between the outer and inner races thus formed by rings $h$ and $c$, respectively, roll balls $j$. It is apparent that by screwing in the end rings $c'$ and $h'$ all of the balls $j$ are brought into contact with the bevels on the rings $c$ and $h$, each ball having a four-point contact and touching four rings—two outside and two inside. As the rings $c$ and $h$ are sufficiently loose to slide longitudinally on journal-sleeve $b$ and in box $f$, any pressure applied by screwing in rings $c'$ or $h'$ will be transmitted through the intervening balls and rings to the flanges $d$ and $g$ at the other end. Thus a uniform contact is secured and maintained between all the balls and the races in which they run. It is obvious that the rings and intervening races and sets of balls can be multiplied indefinitely, so that it becomes readily possible thus to make bearings for any load, no matter how great. By the simple adjustment at one end by rings $c'$ and $h'$ any number of races are perfectly adjusted to the balls they hold. The adjustment is transmitted, to be exact, as follows: ring $h'$ being screwed in presses against the first set of balls $j'$. These balls in turn press against the ring $c^2$, diagonally opposite from $h'$. Ring $c^2$ is pushed in on the journal-sleeve $b$, transmitting its thrust to the next set of balls $j^2$. Thence the pressure is transmitted diagonally through the balls $j^2$ to the ring $h^3$, thence diagonally through the balls $j^3$ to another ring $c^4$, and so on. Adjustment is always transmitted diagonally through the balls. Each adjusting-ring adjusts to two opposite points on the balls. The other adjusting-ring adjusts to the two other points. Thus the two adjusting-rings adjust to the four points on each ball and the adjustment is complete. The adjustment is diagonal to alternate rings $h'$ to $c^2$ to $h^3$ to $c^4$, &c., and $c'$ to $h^2$ to $c^3$ to $h^4$, &c. Each adjustment is independent of the other, so that a little variation in the thickness of the rings does not impair the adjustment. When the adjustment of all the races to the balls has been made by the rings $c'$ and $h'$, the adjustment is secured by the locking-rings $e$ and $i$. It will be observed that the flange $g$ and the locking-ring $i$ extend in toward the center past the outside of the rings $c^5$ and $c'$. The object of this is twofold—to keep out the dirt and to form an oil-reservoir. The spaces between the rings $h$ and the balls may be filled with oil up to the inside circle of the flange $g$ and ring $i$ on the lower side of the box to the level indicated by the line $x\ x$. Thus the bearing is made self-oiling. As the balls roll around in their races, they roll into the oil in the bottom of the box and are kept constantly lubricated.

By this construction of ball-bearings I not only obtain a multiple ball-bearing wherein any load can be distributed uniformly over a number of balls sufficient to carry the load with entire safety, I not only secure such a bearing with perfect four-point contact for all the balls and one that is self-oiling and dust-proof, but I secure a construction that can be made cheaply. The faces on the rings do not have to be ground to micrometer exactness. If some rings are larger than others, they adjust themselves perfectly. Difference in the thickness of the rings does not produce variation in the pressure on the balls. The load is distributed with exact uniformity onto any number of balls that may be used. Thus the sustaining of enormous loads is made entirely practicable without incurring danger of breaking balls or rings. The adjusting-rings $c'$ and $h'$ will be screwed in until all the faces come in contact with the balls. This avoiding of the necessity of exact grinding is an important saving in the expense of manufacturing my bearing.

It is obvious that my bearings may be used with equal advantage either where the box or casing revolves and the shaft or journal does not turn, as in loose pulleys and ordinary truck or wagon wheels, or where the journal turns and the casing does not, as in the case of shafting, car-journals, &c. It is also a thrust-bearing. In short, as a practical bearing it is complete, and so of universal applicability.

I claim as new—

1. In ball-bearings, in combination, a journal, longitudinally-movable rings thereon forming ball-races between them, a casing, longitudinally-movable rings therein forming ball-races between them, balls running between the races thus formed in the casing and the races thus formed on the journal, adjusting means for bringing all of said rings into contact against the balls.

2. In ball-bearings, in combination, a journal and longitudinally-movable rings thereon forming ball-races between them, and an adjusting-ring therefor, a casing and longitudinally-movable rings therein forming ball-races between them, and an adjusting-ring therefor, balls running between the journal and casing-races thus formed.

3. In ball-bearings, a journal and race-forming rings thereon, a casing and race-forming rings therein, sets of balls in the intervening races between said rings, said rings being longitudinally movable so as to transmit adjustment from the rings at one end through the succeeding rings and intervening balls and bring all the rings into adjustment against the balls, and adjusting means.

4. In ball-bearings, a casing having race-forming rings therein confined between a stop at one end thereof and an adjusting means at the other, a journal having race-forming rings thereon confined between a stop at one end and an adjusting means at the other, sets of balls in the intervening races between said rings.

In testimony whereof I have signed my name to this specification in the presence of two subscribing witnesses.

FREDERICK W. GURNEY.

Witnesses:
A. W. KETTLE,
L. A. DUNHAM.